Oct. 2, 1934. P. F. SCOFIELD 1,975,175
MAGNETO FIELD MEMBER
Filed Nov. 5, 1932
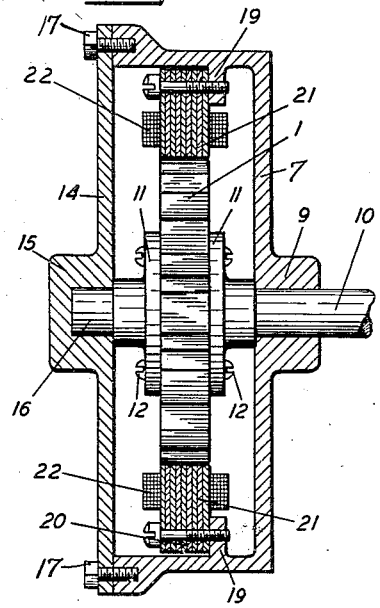
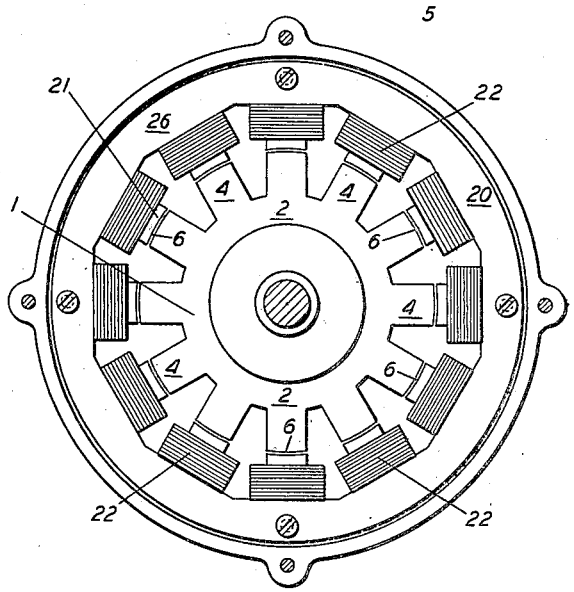
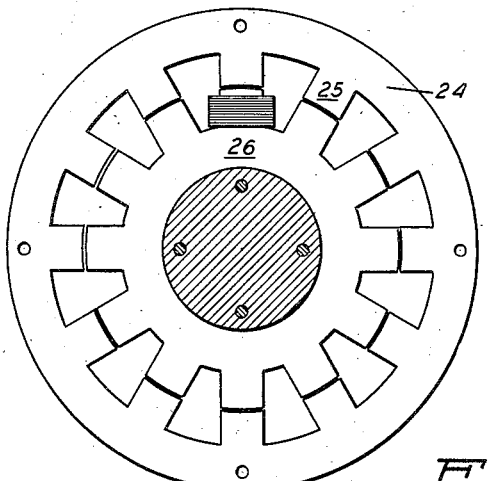
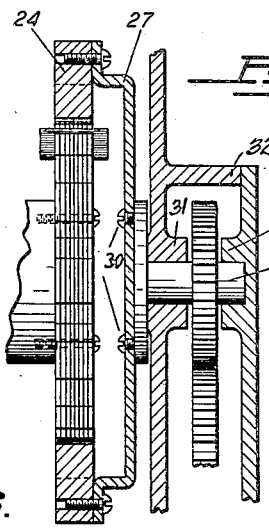
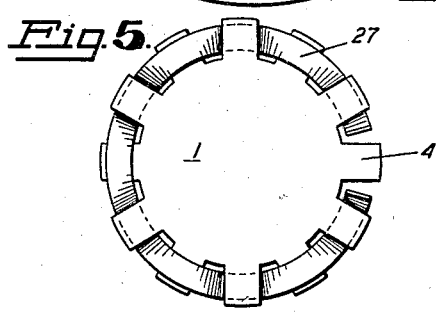
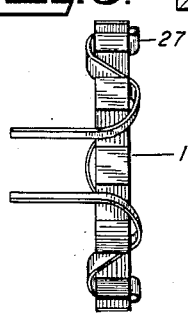
INVENTOR,
PHILIP F. SCOFIELD.
BY Donald K. Lippincott
ATTORNEY Patented Oct. 2, 1934

1,975,175

UNITED STATES PATENT OFFICE 1,975,175

MAGNETO FIELD MEMBER

Philip F. Scofield, Palo Alto, Calif., assignor to Heintz & Kaufman, Ltd., San Francisco, Calif., a corporation of Nevada Application November 5, 1932, Serial No. 641,472

6 Claims. (Cl. 171—252)

My invention relates to a magneto field and more particularly to such a field that may be used in a magneto generator of the inductor type.

Among the objects of my invention are: To provide a unitary field structure for a magneto; to provide a field structure for a magneto formed from a single piece of magnetizable material; to provide a field structure for an inductor alternator capable of rotation or oscillation at high peripheral speeds; and to provide a means for charging or magnetizing a unitary field structure for an inductor alternator.

Other objects of my invention will be apparent or will be specifically pointed out in the description forming a part of this specification, but I do not limit myself to the embodiment of my invention herein described, as various forms may be adopted within the scope of the claims.

Referring to the drawing:

Figure 1 is a view partly in section and partly in elevation of an alternator or magneto employing a unitary field.

Figure 2 is a plan view of the alternator shown in Figure 1.

Figure 3 is a plan view of a modified form of field structure.

Figure 4 is a sectional view of the modified structure shown in Figure 3.

Figure 5 is a plan showing means for charging the field shown in Figures 1 and 2.

Figure 6 is an edge view of the charging means shown in Figure 5.

In the design of small magneto generators, especially those which are to be geared to airplane engines to furnish power in the form of alternating current for radio installations, minimum weight and high rotational speeds are imperative. Permanent magnet fields are preferable, and to avoid commutators or slip rings, it is always desirable to rotate the field. In order to obtain a high power output high rotational speeds are necessary and absolute freedom from service replacements is demanded.

Broadly speaking my invention comprises a field structure capable of being rotated at extremely high speeds, which is formed from a single piece of magnetizable material, thus preventing any deformation, shifting of parts or like disability in use. I prefer to form the field in the shape of a ring having a plurality of salient poles, and then magnetize the poles alternately north and south by passing a current through a conductor temporarily wound around the poles to produce the desired charging. The charging conductor is removed when the field is in service, and the charging may also be performed while the armature is in place.

In the drawing which illustrates two preferred forms of field structure each formed from a single piece of magnetizable material, Figures 1 and 2 show a field rotating inside of an armature assembly.

A unitary field structure 1 is formed preferably by drop forging and heat treatment from a single billet of cobalt-chrome magnet steel into the rough shape as shown, and is machined by grinding or other customary finishing methods into a basal ring portion 2 and a plurality of outwardly projecting salient poles 4. A central aperture 5 is finished to center the structure, and the outer ends of the pole extensions are ground to describe a circumference of a circle and thereby form working pole faces 6.

While the unitary magnet thus formed may be fully charged before insertion into the alternator, I prefer to charge it after insertion, and will describe the charging process later. A partial charge is usually given before insertion.

A generator housing 7 is provided with a bearing 9 through which is mounted a drive shaft 10 carrying mounting plates 11—11 between which the field is clamped by bolts 12. The housing is provided with a generator cover 14 which carries a cover bearing 15 which supports a shaft extension 16. This cover is secured on the housing by cover bolts 17. It should be noted that the generator housing and cover may be integral with engine castings, or like framework of the prime mover, and the type of housing shown is offered only as an example.

An armature support ring 19 preferably cast integral with the housing supports armature lamination rings 20 having core projections 21 on which are mounted armature coils 22, connected in series as desired, and the terminals brought out in any convenient manner.

In the embodiment shown in Figures 3 and 4 the field structure is also formed from a single billet of magnet steel, but here the outer ring 24 has a plurality of inwardly projecting salient poles 25, with an armature assembly 26 mounted on the inside of the field structure. The field in this type is rotated through a drive web 27 attached to a driven shaft 29 by screws 30. This shaft is supported by bearings 31 in a prime mover frame 32.

I prefer to use 12 poles on the generators described, and 12 armature coils. I also prefer to make the distance between the pole faces equal to the extent of the face itself. It is desirable to rotate the fields at approximately 4,000 R. P. M. at which speed alternating current is generated, when the field is charged, at a frequency of about 400 cycles. The power output will depend on the size of the alternator.

Figures 5 and 6 illustrate a preferred means of charging the unitary field structure. An insulated copper tape 27 of heavy cross section is wound alternately around the pole projections, and direct current of high amperage is applied to the ends of the tape. Alternate poles will be charged north and south, the basal ring completing the circuit between the pole extensions. As the magnetic flux is largest when the field member is charged with a keeper, or pole connector in place, and decreases when the keeper is removed, I prefer to charge the field structure after it is in place so that the armature laminations may act as keepers, and the field used in service without removal. In this case I use an insulated ribbon, the copper tape being woven of fine wires so that it is flexible enough to be threaded around the pole projections after the field is in place in the generator. After the charging current has been applied, the tape is readily removed. The same procedure may be employed at any time without removing the field from the alternator.

I prefer to charge the magnets by supplying large instantaneous currents through the charging tape, generated by the collapse of the field of a large transformer. In this way it is possible to fully and completely charge the magnetic structure as described when formed from cobalt-chrome magnet steel. By causing approximately 2,000 amperes to flow by a single field collapse, it is possible to charge such a structure to a density hitherto unattainable, and it is this ability to thus charge the unitary magneto field which has made possible its utilization in magnetos and other generators, with efficiencies comparable to current-excited fields.

It is also possible to use a charging tape of a cross section much smaller than that capable of passing such large currents for any appreciable length of time, as the short duration of the surge prevents excessive rises in temperature.

I have found that a unitary field structure as described is highly efficient in service, particularly for small generators built into airplane engines. A minimum weight per unit of flux density is achieved, and the absolute assurance that no shifting of the rotating parts may occur, has been a deciding factor in obtaining permission from pilots and engine designers, to attach the generator to airplane engines.

I claim:

1. In combination, a ring of permanently magnetizable material having a plurality of integral uniformly spaced salient poles, means for magnetizing said pole extensions comprising a flexible conductor adapted to carry direct current threaded alternately around and between said salient poles, said conductor being adapted to be removed after magnetization.

2. The combination in a generator of a field member adapted to be rotated comprising permanently magnetizable material having a plurality of integral uniformly spaced and radial salient poles, a plurality of stationary armature coils in which current is induced by the rotation of said field member, and means for magnetizing said field member in situ comprising a flexible conductor threaded alternately around and between said salient poles, said conductor being adapted to be removed from said field member after said field member is magnetized.

3. The combination in a generator of a field member adapted to be rotated comprising permanently magnetizable material having a plurality of integral uniformly spaced and radial salient poles, a plurality of stationary armature coils in which current is induced by the rotation of said field member, means for magnetizing said field member in situ comprising a flexible conductor threaded alternately around and between said salient poles, said conductor being adapted to carry a heavy instantaneous charging current and adapted to be removed from said field member after said field member is magnetized.

4. The combination in a generator of a field member adapted to be rotated comprising permanently magnetizable material having a plurality of integral uniformly spaced and radial salient poles, a plurality of stationary armature coils in which current is induced by the rotation of said field member, means for magnetizing said field member in situ comprising a flexible conductor threaded alternately around and between said salient poles, said conductor being adapted to be removed from said field member after said field member is magnetized, and adapted to carry a heavy instantaneous charging current, said current being greater than said conductor can carry for an appreciable length of time without overheating.

5. The method of magnetizing an unwound rotatable permanently magnetizable field member in situ in a generator which comprises threading a flexible conductor around and between the salient poles of said field member, passing a heavy instantaneous charging current through said conductor, and thereafter removing said conductor.

6. The method of magnetizing an unwound rotatable permanently magnetizable field member in situ in a generator, which comprises threading a flexible conductor around and between the salient poles of said field member, passing a heavy instantaneus current through said conductor, said current being greater than said conductor can carry for an appreciable length of time without overheating, and thereafter removing said conductor.

PHILIP F. SCOFIELD.